(No Model.) 7 Sheets—Sheet 5.

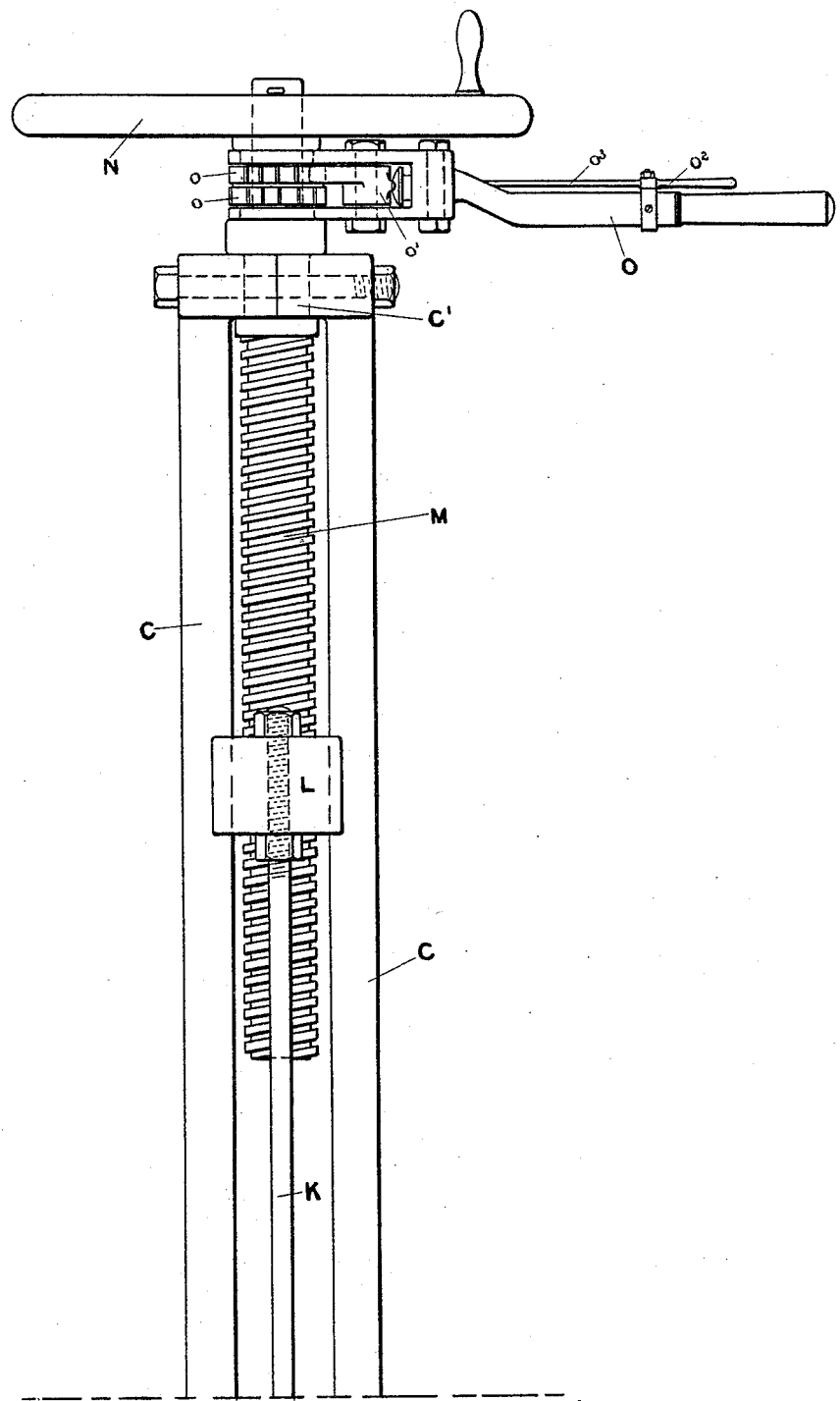

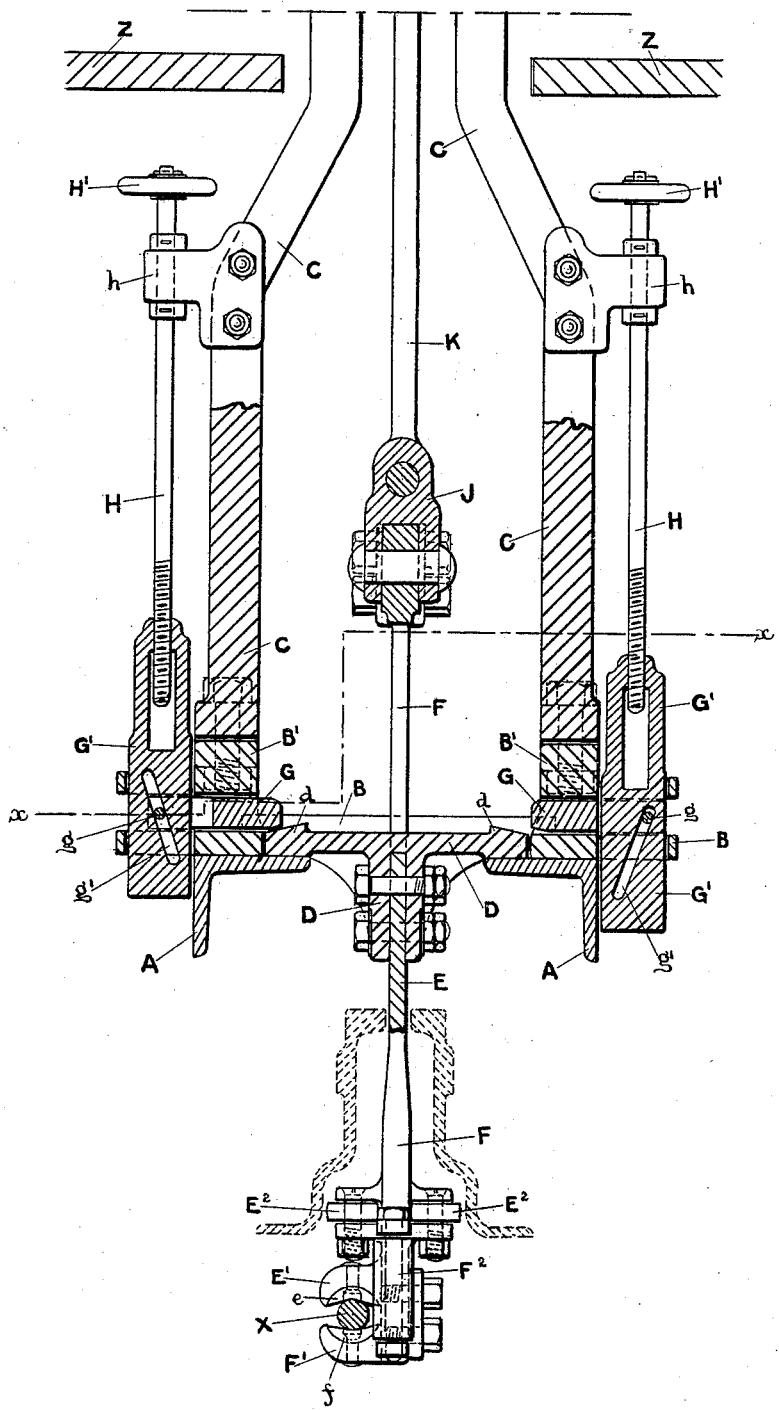

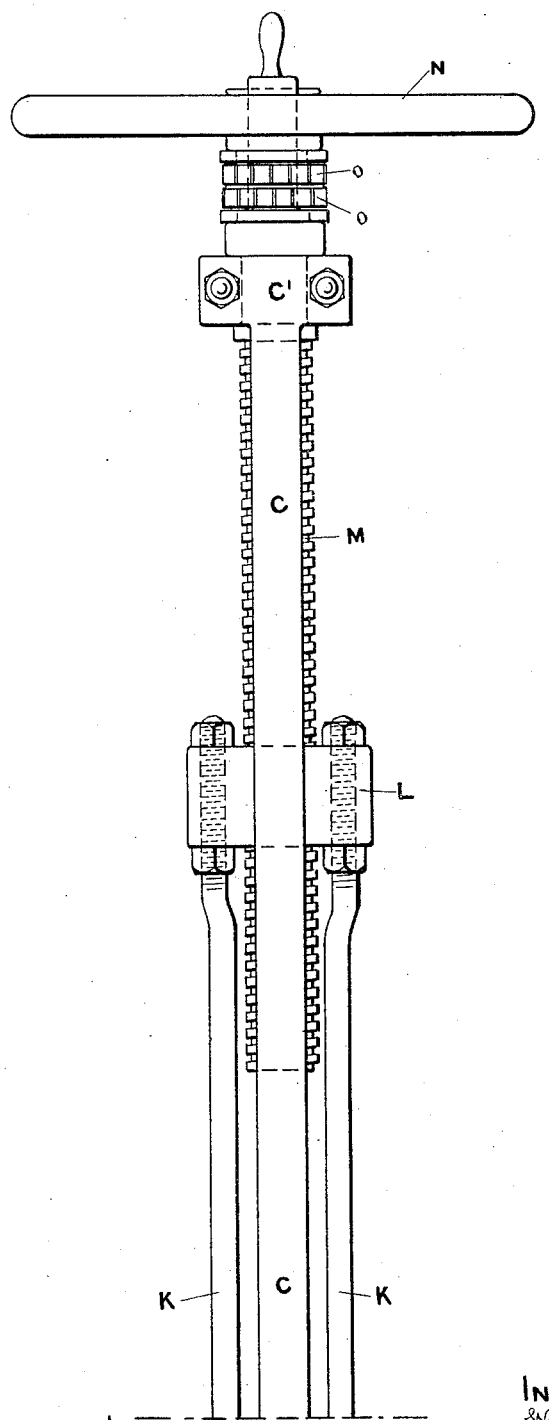

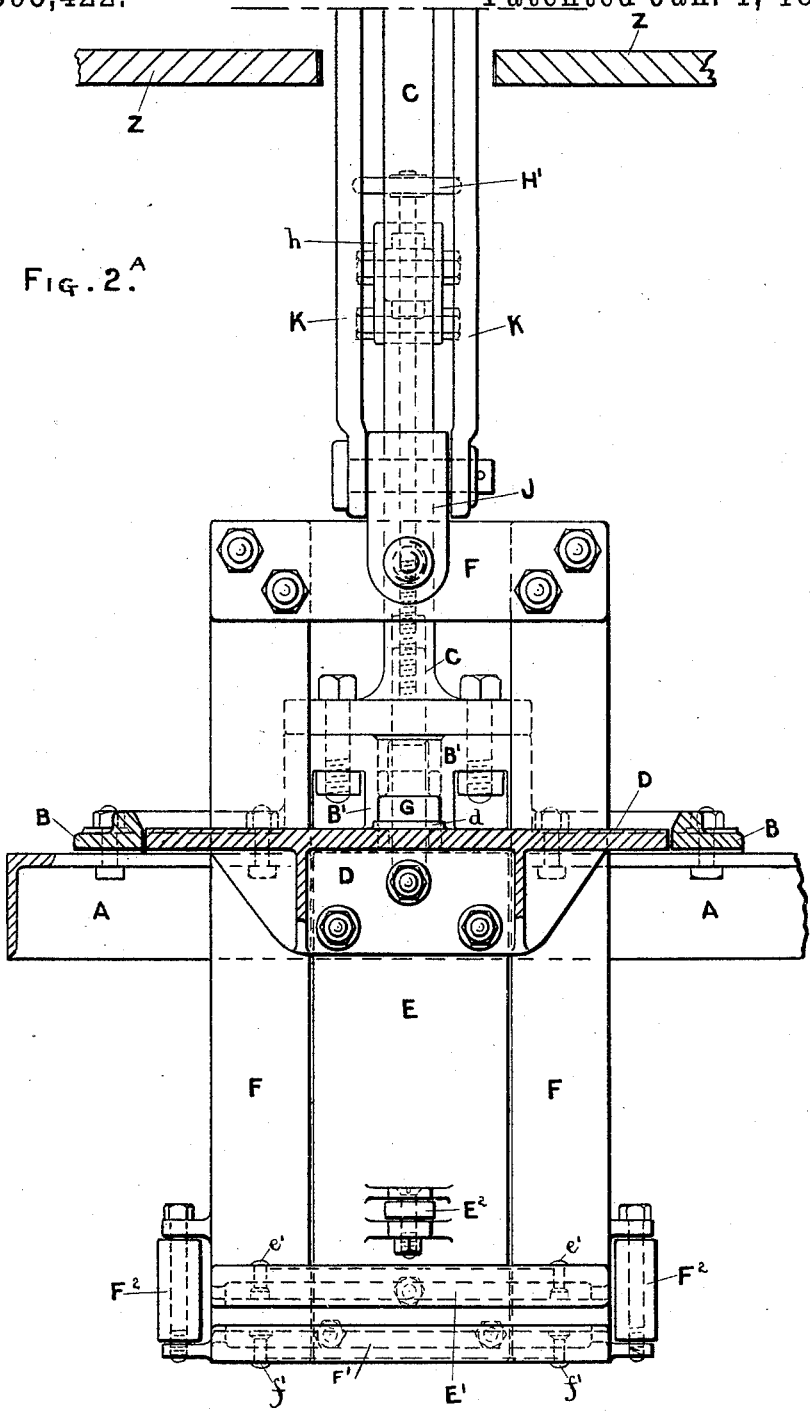

W. N. COLAM.
CABLE TRAMWAY GRIPPER.

No. 395,422. Patented Jan. 1, 1889.

WITNESSES:
Edward L. Hammond.
Arthur M. Flack.

INVENTOR:
William Newby Colam.
By his Attorney.
Robt. Ed. Phillips (No Model.) 7 Sheets—Sheet 6.

W. N. COLAM.
CABLE TRAMWAY GRIPPER.

No. 395,422. Patented Jan. 1, 1889.

WITNESSES:
Edward E. Hammond.
Arthur M. Flack.

INVENTOR:
William Newby Colam.
By his Attorney.

(No Model.) 7 Sheets—Sheet 7.
W. N. COLAM.
CABLE TRAMWAY GRIPPER.

No. 395,422. Patented Jan. 1, 1889.

UNITED STATES PATENT OFFICE.

WILLIAM NEWBY COLAM, OF LONDON, COUNTY OF MIDDLESEX, ENGLAND.

CABLE-TRAMWAY GRIPPER.

SPECIFICATION forming part of Letters Patent No. 395,422, dated January 1, 1889.

Application filed February 29, 1888. Serial No. 265,752. (No model.)

*To all whom it may concern:*

Be it known that I, WILLIAM NEWBY COLAM, a subject of the Queen of Great Britain, residing at London, in the county of Middlesex, England, have invented certain new and useful Improvements in Cable Tramways, of which the following is a specification.

My invention consists of certain details of construction and combination of parts, as will hereinafter be described, and pointed out in the claims.

Figure 3:
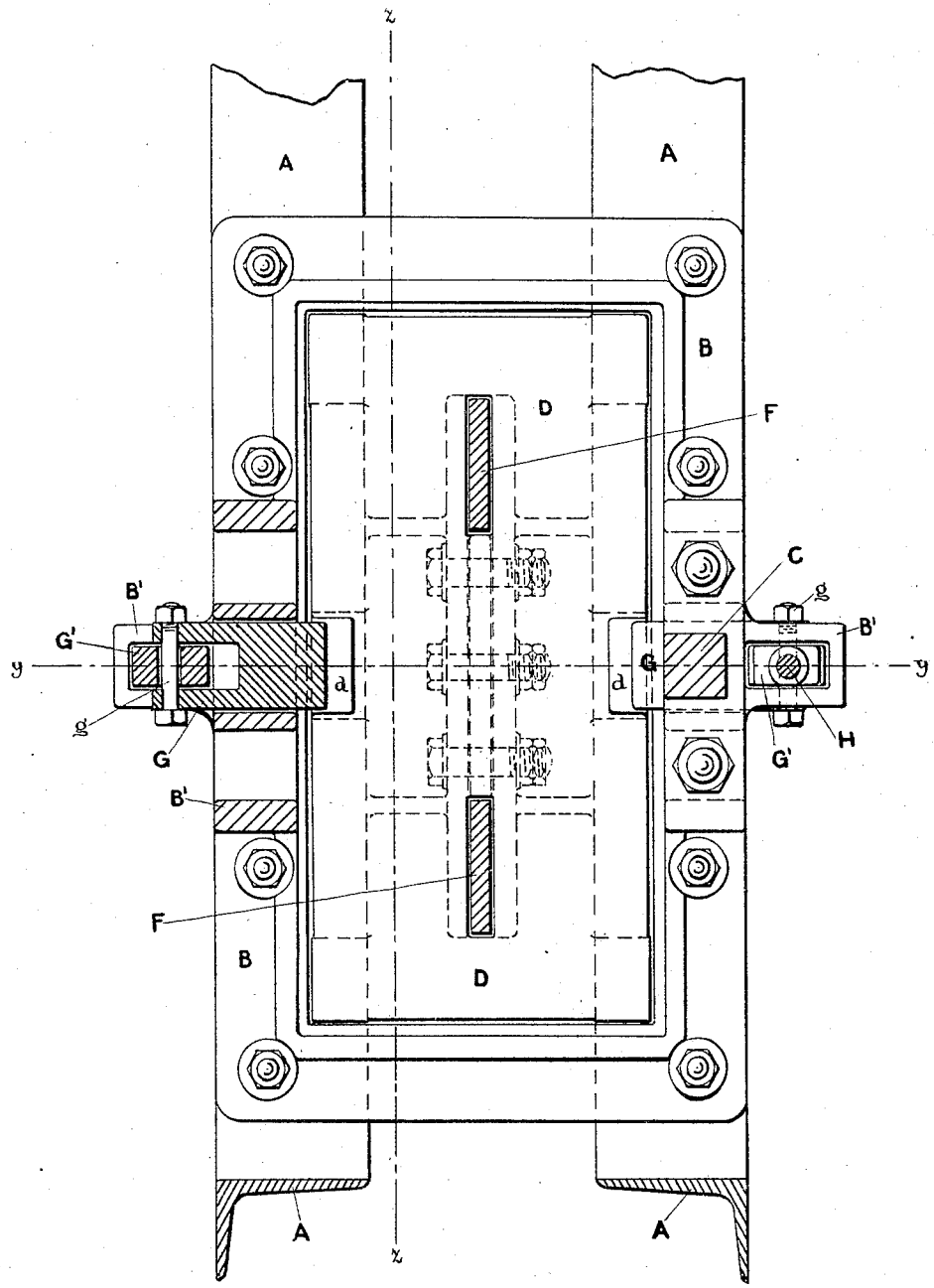
Figure 4:
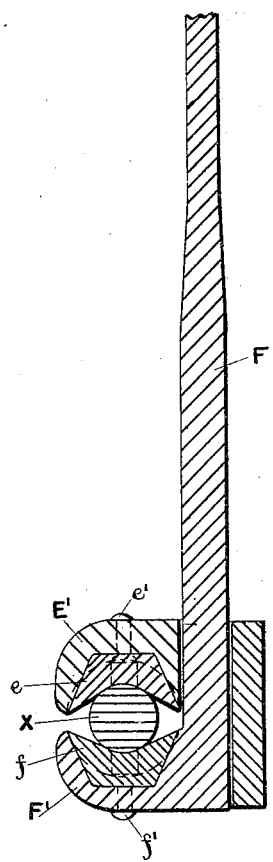
Figure 5:
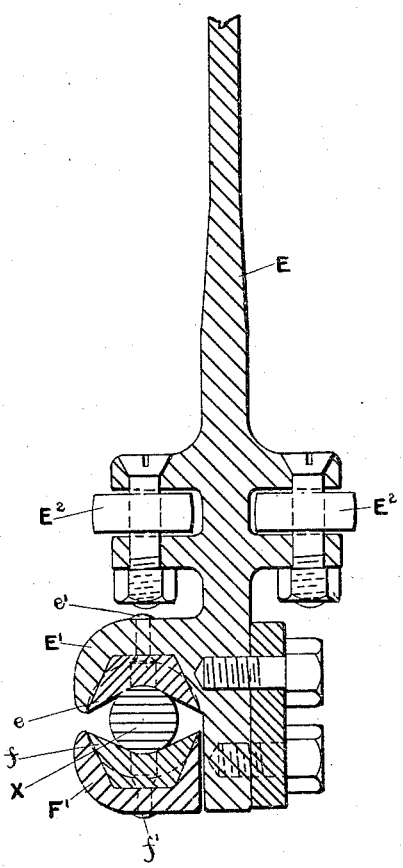
Figure 6:
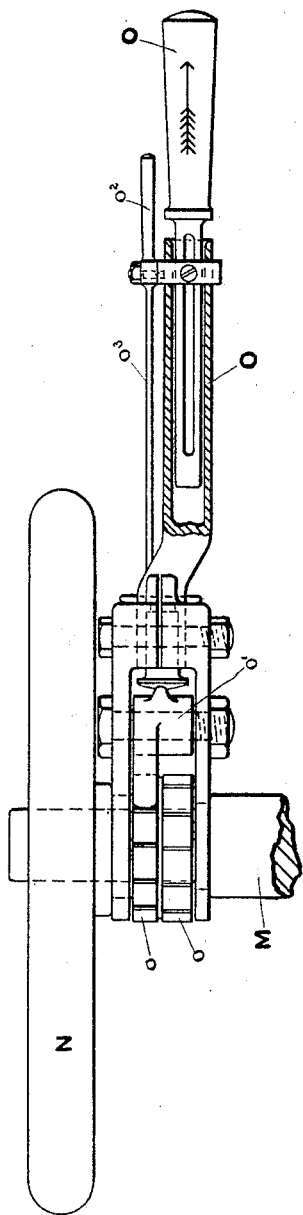
Figure 7:
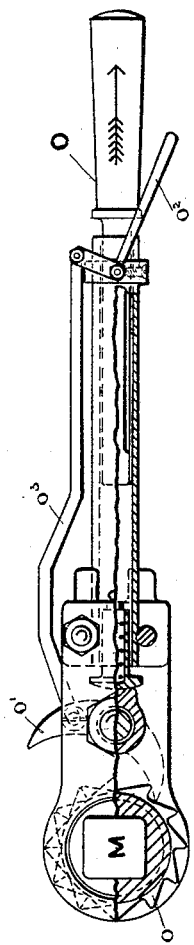

In the accompanying drawings, Figures 1 and 1$^A$, Sheets Nos. 1 and 2, are views in front elevation, partly in section, on line $y\ y$, Fig. 3, Sheet No. 5, of a gripper embodying my invention. Figs. 2 and 2$^a$, Sheets Nos. 3 and 4, are views thereof in sectional side elevation on line $z\ z$, Fig. 3, Sheet No. 5. Fig. 3, Sheet No. 5, is a sectional plan thereof on line $x\ x$, Fig. 1$^A$, Sheet No. 2. Figs. 4 and 5, Sheet No. 6, are views, in cross-section, of the jaws of of the gripper on an enlarged scale; and Figs. 6 and 7, Sheet No. 7, are views in side elevation and plan, respectively, partly in section, of the operating hand-wheel and lever.

Throughout the views similar parts are marked with like letters of reference.

On a suitable frame, A, which may either form part of or be attached to the under frame of the car, or may be supported by the axles of the wheels thereof, is fixed a foundation or base plate, B, to which are fixed two upright stanchions, C C, to support and carry the mechanism for operating the gripper in a manner that will hereinafter be explained. Resting in or on the foundation-plate B is a loose plate, D, to the under side of which is attached the fixed shank E, carrying the fixed jaw E′ of the gripper. The loose plate D is adapted to be locked down to the foundation-plate B by a pair of tongues, G G, sliding horizontally in blocks B′ B′, formed on the foundation-plate B. The gripping ends of these tongues G G are beveled to engage with wedge-shaped pieces $d\ d$ on the plate D, one tongue being shown in Fig. 1$^A$, Sheet No. 2, of the accompanying drawings engaging with the plate D and the other clear thereof. The sliding tongues G G are operated by pieces G′ G′, adapted to be moved vertically and operate the sliding tongues G G through the slots $g'\ g'$ and the pins $g\ g$, or by any other equivalent cam arrangement. The sliding pieces G′ G′ are adapted to receive the screwed ends of a pair of screwed spindles, H H, mounted in suitable bearings, $h\ h$, on the stanchions C C, and provided with hand-wheels H′ H′, whereby they may be rotated to operate the sliding tongues G G to lock down or release the loose plate D, carrying the shank E of the fixed jaw E′ of the gripper. If desired, the screwed spindles H H may be connected with one another, so that the rotation of one will effect the rotation of the other; or the sliding tongues may be so coupled together that the movement of one will operate the other in a like manner.

The hand-wheels H H are preferably arranged immediately below the floor Z of the platform of a car, the said platform, or such portions thereof as may be necessary, being hinged or arranged to lift to get at the said hand-wheels.

The moving jaw F′ of the gripper is carried by a moving shank, F, preferably consisting of two limbs connected by a suitable cross-plate, as shown, and connected by a cross-head, J, and a pair of links, K K, with a traveling nut, L, guided between the stanchions C C and engaging with an endless screw, M, mounted in a suitable bearing, C′, on the tops of the stanchions C C. The screw M is operated by both a hand-wheel, N, and a hand-lever, O. The former is fixed to the end of the screw in the usual manner, while the hand-lever is connected to the screw by a reversible ratchet-and-pawl gear of any suitable construction, the ratchet-wheels $o\ o$ being fixed to the screw M, and the double reversing-pawl $o'$, mounted on the hand-lever O, as shown. The lever O is preferably made telescopic in its length, as shown, so that the leverage may be varied as required. The reversing-pawl $o'$ is controlled by a suitable finger-lever, $o^2$, and coupling-rod $o^3$.

By using both a hand-wheel and a hand-lever the pitch of the screw M may be made much coarser than is usual when only a hand-wheel is used, and thus a quick action can be obtained to pick up or grip on the cable by means of the hand-wheel, while the hand-lever O and its reversible ratchet-and-pawl gear provide a means of obtaining greater leverage to get a more powerful grip of the cable when surmounting steep inclines in bad weather, or otherwise when the grip obtained through the hand-wheel is insufficient.

The under side of the moving jaw of the gripper is beveled off toward the edge nearest to the opening to the jaws of the gripper, so that when it is lowered to pick up the cable it forces the cable aside and allows it to spring in between the jaws. I therefore prefer to use narrow supporting-pulleys for carrying the cable. The jaws of the gripper E' and F' are recessed to receive soft-iron dies $e$ and $f$, which are fixed by white-metal rivets $e'$ $f'$, &c., which merely keep the dies in place in the recesses of the jaws, and are subjected to no strain, as the ends of the recesses take all the thrust caused by the grip of the cable. By the use of these soft-iron dies all undue wear on the cable X is avoided, and a ready means of renewing the gripping-surfaces is provided.

On the shank E of the fixed jaws E' of the gripper are mounted two small rollers, $E^2$ $E^2$—one on each side thereof—in such a position that they will run on or bear against the vertical sides of the slot-rails, which are made of a section shown in dotted lines in Fig. $1^A$, Sheet No. 2, of the accompanying drawings, and which forms part of the subject-matter for an application for a patent filed, Serial No. 265,754, when the gage of the permanent way has become disturbed or when the car is running round curves. By this means the shanks E and F of the gripper are prevented from rubbing against the inner sides of the top edge of the slot-rails.

On each end of the gripper—on the shanks carrying the moving jaw—are mounted vertical rollers $F^2$ $F^2$, adapted to guide the cable between the jaws, and so prevent it chafing on the edges thereof.

When it is desired to lift the gripper clear of the cable-way and surface of the road, the tongues G G are drawn back to release the plate B in the manner hereinbefore described. The hand-wheel N is then turned to operate the screw M in the direction necessary to close the jaws of the gripper. When this is effected, the continued rotation of the screw M causes the moving jaw of the gripper to lift the fixed jaw, owing to the freedom of the plate D. It will be seen that the screw M is made sufficiently long to allow of the entire gripper being lifted clear of the surface of the track through any suitable hatchway therein.

With this construction of gripper the cable can easily and readily be picked up by the grip-man by means of the gripper alone. A great saving of time is effected in inspecting or repairing the jaws of the gripper of a running car or in moving the car over a section of the track that may be blocked or otherwise rendered unfit for the passage of the car with its gripper below the surface of the track.

I would have it understood that I do not limit myself to the exact construction hereinbefore shown and described, but hold myself at liberty to make such changes and alterations as fairly fall within the spirit and scope of my invention.

Having fully described my invention, what I claim as new, and desire to secure by Letters Patent, is—

1. In a gripper for cable tramways, the combination, with a foundation-plate permanently secured to the car, of a movable grip-jaw supported by the said foundation-plate, a fixed grip-jaw, and a plate detachably connected to the said foundation-plate and supporting the fixed grip-jaw, whereby the fixed grip-jaw and the cable may be raised by the continued upward motion of the moving jaw when required.

2. In a gripper for cable tramways, the combination, with the loose plate carrying the fixed jaw of the gripper, of the holding-down tongues mounted in blocks on the foundation-plate and adapted to slide transversely to engage with the said loose plate, as and for the purpose set forth.

3. In a gripper for cable tramways, the combination, with the loose plate carrying the fixed jaw, of the links and cross-head carrying the shank of the moving jaw and adapted to receive a vertical movement by means of the traveling nut working on the screw operated by a hand-wheel and lever, as and for the purpose set forth.

4. In a gripper for cable tramways, the combination, with a movable grip-jaw provided with a shank, a revoluble screw operatively connected to the said shank, and a foundation-plate permanently secured to the car for supporting the said moving jaw and its screw, of a fixed grip-jaw, a loose plate supporting the said grip-jaw, and locking mechanism detachably connecting the said loose plate to the foundation-plate, substantially as and for the purpose set forth.

5. In a gripper for cable tramways, the combination, with a movable grip-jaw provided with a shank, a revoluble screw operatively connected to the said shank, and a foundation-plate permanently secured to the car for supporting the said moving jaw and its screw, of a fixed grip-jaw, a loose plate supporting the said fixed grip-jaw, and retractible locking-tongues provided with guides and detachably connecting the said loose plate to the foundation-plate, substantially as and for the purpose set forth.

6. In a gripper for cable tramways the moving jaw of which is operated by a rotating screwed spindle, the combination, with a hand-wheel for operating the said screwed spindle, of a hand-lever pivoted on the said spindle and connected thereto by a reversible ratchet-and-pawl gear, as and the purpose set forth.

7. In a gripper for cable tramways the moving jaw of which is operated by a rotating spindle, the combination, with a hand-wheel for operating the said spindle, of a telescopic hand-lever mounted loosely on the said spindle and connected thereto by a reversible ratchet-and-pawl gear, as and for the purpose set forth.

8. In a cable tramway the gripper of which is operated by the rotary motion of a screwed spindle, the combination, with a hand-wheel for operating the said spindle, of the auxiliary hand-lever for operating the said spindle with increased leverage, the loose plate carrying the shank of the fixed jaw of the gripper, the tongues for locking the loose plate of the foundation-plate carrying the gripper mechanism, and the screwed spindles for operating the locking-tongues through suitable sliding cams, as and for the purpose set forth.

9. In a gripper for cable-tramways, the combination, with the moving jaw operated by a hand-wheel through a suitable endless screw and traveling nut, of the auxiliary telescopic hand-lever adapted to operate the said endless screw through a reversible ratchet-and-pawl gear, the loose plate carrying the fixed jaw adapted to be locked down to the foundation-plate carrying the gripper mechanism, the sliding tongues for locking down the said loose plate, the screwed spindles and sliding cam-pieces for operating the said tongues, and the detachable dies in the jaws, all arranged and operating as and for the purpose set forth.

In witness whereof I have hereunto signed my name in the presence of two subscribing witnesses.

WILLIAM NEWBY COLAM.

Witnesses:
  ROBT. ED. PHILLIPS,
  EDWARD C. HAMMOND.